US011268627B1

(12) United States Patent
Sarno

(10) Patent No.: US 11,268,627 B1
(45) Date of Patent: Mar. 8, 2022

(54) ADJUSTABLE CHECK VALVE

(71) Applicant: Magic Plastics, Inc., Valencia, CA (US)

(72) Inventor: Anna Sarno, Valencia, CA (US)

(73) Assignee: Magic Plastics, Inc., Valencia, CA (US)

( * ) Notice: Subject to any disclaimer, the term of this patent is extended or adjusted under 35 U.S.C. 154(b) by 0 days.

(21) Appl. No.: 17/014,864

(22) Filed: Sep. 8, 2020

(51) Int. Cl.
*F16K 15/00* (2006.01)
*F16K 31/06* (2006.01)
*F16K 15/03* (2006.01)

(52) U.S. Cl.
CPC ......... *F16K 31/0655* (2013.01); *F16K 15/03* (2013.01); *Y10T 137/7898* (2015.04)

(58) Field of Classification Search
CPC ......... Y10T 137/7898; Y10T 137/7903; Y10T 137/7878; F16K 15/03; F16K 15/034; F16K 31/084
See application file for complete search history.

(56) References Cited

U.S. PATENT DOCUMENTS

| | | | |
|---|---|---|---|
| 1,057,435 A | 4/1913 | Renaud | |
| 1,213,499 A | 1/1917 | Johnson | |
| 1,285,110 A | 11/1918 | Funk | |
| 1,668,456 A | 4/1924 | Jennings | |
| 2,342,485 A | 2/1944 | Percifield | |
| 2,827,921 A | 3/1958 | Sherman et al. | |
| 3,289,693 A | 12/1966 | Scaramucci | |
| 3,294,115 A | 12/1966 | Koenigsberg et al. | |
| 3,395,727 A | 8/1968 | Weise et al. | |
| 3,612,098 A | 10/1971 | Bora et al. | |
| 3,665,958 A * | 5/1972 | Dunkelis | F16K 17/00 137/522 |
| 3,891,000 A | 6/1975 | Melnick | |
| 4,031,930 A | 6/1977 | Sutcliffe et al. | |
| 4,034,780 A | 7/1977 | Horvath | |
| 4,091,837 A * | 5/1978 | Edmunds | F16K 17/194 137/341 |
| 4,253,489 A * | 3/1981 | Schleiter, Sr. | F16K 17/04 137/527 |
| 4,297,113 A * | 10/1981 | Theodore | B01D 46/0095 55/341.1 |
| 4,427,025 A | 1/1984 | Prince | |
| 5,368,013 A * | 11/1994 | Herweyer | F24D 12/02 122/14.31 |
| 6,050,294 A * | 4/2000 | Makowan | E03B 7/077 137/527 |
| 6,155,291 A * | 12/2000 | Powell | F16K 15/035 137/512 |
| 6,527,006 B2 * | 3/2003 | Jackson | F16K 15/033 137/527.6 |
| 6,585,000 B2 | 7/2003 | Radford | |

(Continued)

FOREIGN PATENT DOCUMENTS

CN          102031810 B          6/2014

*Primary Examiner* — Robert K Arundale
(74) *Attorney, Agent, or Firm* — James M. Duncan; Scanlon Duncan LLP

(57) ABSTRACT

A check valve has an internal gate having an adjustable retention force, such that in the event that if the differential pressure between the upstream and downstream pressure changes, the force required to allow flow through the valve may be adjusted without removal of the valve from the piping system.

19 Claims, 11 Drawing Sheets

(56) References Cited

U.S. PATENT DOCUMENTS

| | | | |
|---|---|---|---|
| 6,648,012 B2 * | 11/2003 | Linthorst | F16K 15/026 |
| | | | 137/522 |
| 2005/0284522 A1 * | 12/2005 | Palle | G01D 11/24 |
| | | | 137/554 |
| 2006/0081292 A1 * | 4/2006 | Sarno | F16K 15/033 |
| | | | 137/527 |
| 2006/0081293 A1 | 4/2006 | Sarno et al. | |
| 2007/0267069 A1 | 11/2007 | Sarno et al. | |
| 2008/0128033 A1 | 6/2008 | McGonigle et al. | |
| 2010/0326544 A1 * | 12/2010 | Elwart | F16K 17/363 |
| | | | 137/527 |
| 2012/0121449 A1 | 5/2012 | Borst et al. | |
| 2015/0323088 A1 | 11/2015 | Zuercher | |
| 2017/0299064 A1 * | 10/2017 | Zock-Obregon | F16K 15/1821 |
| 2018/0100602 A1 | 4/2018 | Feng et al. | |
| 2019/0316694 A1 * | 10/2019 | Claes | F04B 39/102 |
| 2021/0231228 A1 * | 7/2021 | Butland | F16K 31/084 |

* cited by examiner

ADJUSTABLE CHECK VALVE

FIELD OF THE INVENTION

A check valve for water pipes which permits flow in a forward direction and prevents flow in the opposite direction, where the pressure required to open the valve is adjustable.

BACKGROUND OF THE INVENTION

Check valves permit fluid to flow in one direction in a conduit but prevent flow in the opposite direction. Check valves are required to prevent backflow into a conduit. The necessary basic capability for a check valve is to have a valve seal which opens when the flow is from upstream to downstream, but to close when downstream pressure exceeds upstream pressure to prevent flow upstream past the check valve. One pervasive problem with check valves is that when systems are idling or shutting down, the pressure differential between upstream and downstream may approach zero, resulting in the check valve fluctuating between open and closed and allowing undesired backflow.

A known solution for dealing with the above-described situation is to use a spring or magnet to maintain the valve closed until the pressure differential between the upstream pressure and downstream pressure reaches a predetermined value which is sufficient to overcome the spring tension or the magnetic force and allow the valve to open. However, with devices which only utilize a spring for valve closure the valve may open gradually depending upon the spring constant. If the differential is close to the predetermined value, the valve might only open partially. In addition, check valves utilizing only spring force for closure require increasing pressure to open past the initial cracking pressure, which is generally not a desirable feature of a check valve.

Another issue which exists with check valves which open at fixed and predetermined values is that for some applications the differential pressure may change over time, but the valve will continue to open at the same value of differential pressure. This may result in undesired flow situations, where either backflow occurs when not desired, or the upstream pressure required to open the check valve becomes greater than desired. In an effort to resolve this problem, some check valves, specifically center poppet valves, allow the adjustment of spring tension by tightening or loosening a screw in the middle of the valve. However, for this type of valve, the valve cannot be permanently installed until the spring tension has been adjusted to the desired tension, which often requires multiple spring adjustments, assembly and disassembly in order to obtain the desired result.

The current adjustable spring check valves, as with the non-adjustable spring valves, have spring tensions which increase as the valve opening increases, resulting in restricted flow. Moreover, the center poppet design has webbing which supports the poppet, which can trap debris, further reducing the flow and keeping the valve from fully closing. The known valves having magnetic closure have a non-adjustable gate retention force.

SUMMARY OF THE INVENTION

Embodiments of the presently disclosed apparatus answers the need identified above. Embodiments of the present invention do not rely upon springs to achieve a desired opening pressure or vacuum, but rather upon a magnet set, where the force which must be overcome for the valve to open is the attractive force between either a pair of opposing magnets or a single magnet and a ferromagnetic magnetic member, where the attractive force may be adjusted by increasing or decreasing the distance between the two.

One embodiment of the valve has a body having an inlet port, an outlet port, and a flow passage there between. The valve and its components are so constructed and arranged such that the valve closes to prevent a reverse flow of a fluid from the outlet port to the inlet port, and the valve opens so as to permit a forward flow of the fluid from the inlet port to the outlet port. However forward flow only occurs under a positive forward differential pressure having a magnitude equal to or above an adjustable value. This feature prevents forward flow at differential pressures lower than the adjustable value.

An embodiment of the check valve has a valve seat in the flow passage through which the fluid will flow and a valve closure carrying a valve seal which is complementary to the valve seat. The valve closure may be pivotally attached to the body inside the flow passage, where the valve closure is configured to pivot against and seal against the valve seat thereby preventing the reverse flow of the fluid when the valve closure is in a closed position. The valve closure is configured to pivot away from the valve seat thereby permitting the forward flow of the fluid when the valve closure is in an open position.

Embodiments of the check valve also have a magnetic set which develops, when the valve closure is in the closed position, where a retention force that must be overcome for the valve closure to move to the open position. The magnet set comprises a first magnet and a ferromagnetic member, which may be a second magnet. In this embodiment, the magnet has a first magnetic pole and second magnet has a second magnetic pole, where the first magnetic pole and the second magnetic pole are disposed in attractive relationship when the valve closure is in the closed position. The magnitude of the positive differential pressure required for the valve to open may be manually adjusted by changing the distance separating either the first magnet and a non-magnet ferromagnetic member or the distance between the first magnetic pole of the first magnet and the second magnetic pole and the second magnet. For embodiments utilizing a non-magnet ferromagnetic member, acceptable materials include iron, cobalt, nickel, steel, manganese, gadolinium and lodestone.

In one embodiment of the check valve the first magnet is disposed within a first compartment adjacent to the flow passage. A shaft penetrates the valve body through an exterior wall and extends into the first compartment, where the first magnet is attached to the shaft. The first magnet may be moved within the first compartment by movement of the shaft either towards the second magnet (or ferromagnetic member) or away from the second magnet (or ferromagnetic member), such movement adjusting the magnitude of the positive differential pressure required for the valve to open. The shaft may be rotatable such that rotation of the shaft translates the first magnet within the first compartment toward the water-tight seal or away from the end of the first compartment adjacent the valve seat. The first magnet may also be contained within a water-tight magnet carriage which is disposed within the first compartment, where an end of the shaft is attached to the magnet carriage. An opposite end of the shaft may extend outside of the valve body and a screw knob disposed on the opposite end of the shaft.

The valve closure may comprise a gate body having a first end pivotally attached to an inside portion of the valve body, the gate body also having a second end opposite the first end, where the second end comprises the second magnet or ferromagnetic member.

The interior of the valve body may also have an inner recess into which the second end of the gate body may be disposed during a forward flow of the fluid. In this configuration embodiments of the valve may allow the flow passage to be fully open during a full forward flow of the fluid.

In some embodiments of the check valve, for example the two-inch valves, the positive differential pressure required to allow the valve to open may be adjusted within a range of 5-15 psi based upon the relative distance between the first magnet and the second magnet (or ferromagnetic member). Nickle plated neodymium (N52 strength) magnets are acceptable for embodiments of the check valve.

DETAILED DESCRIPTION OF THE EMBODIMENTS

Figure 1:
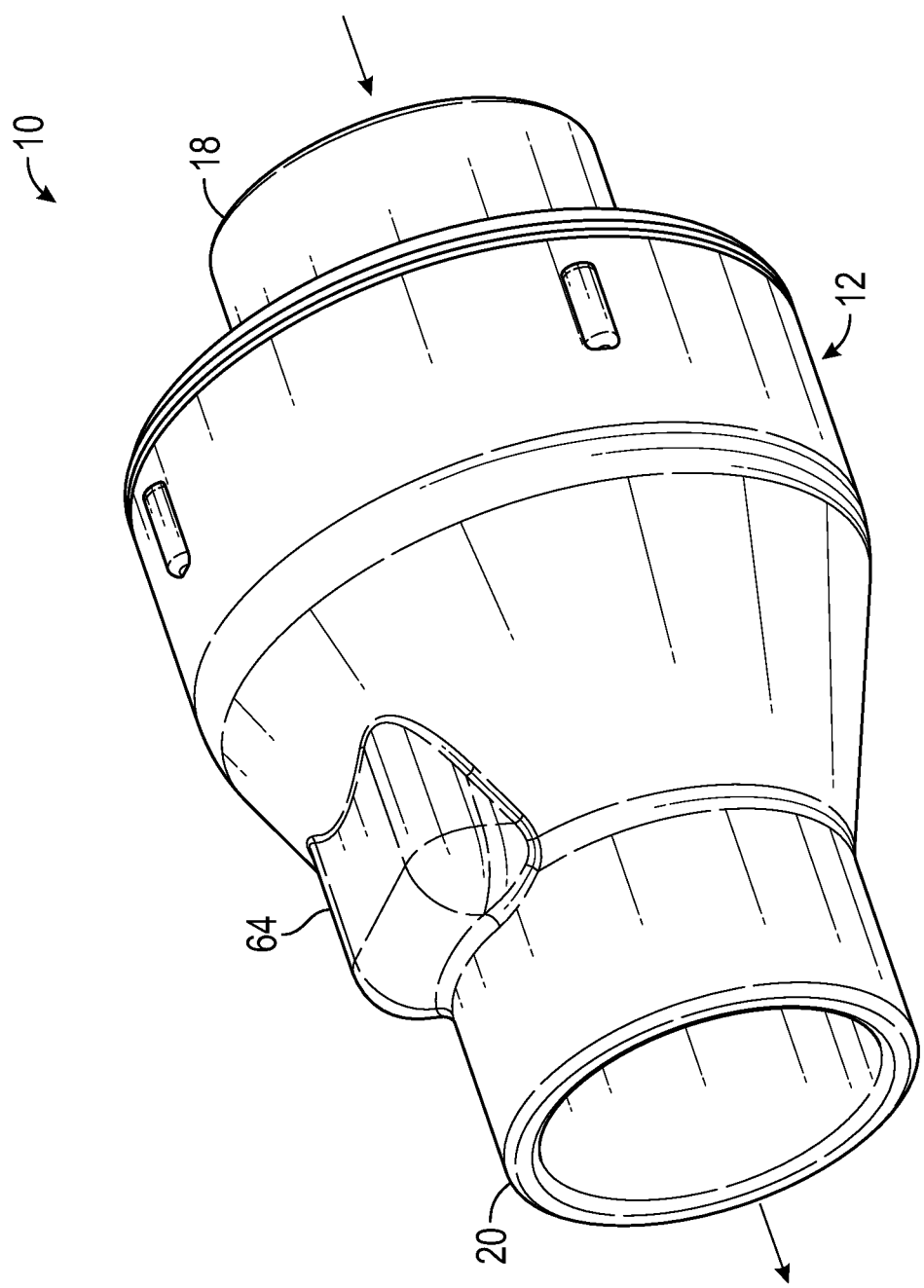
FIG. 1 depicts a perspective exterior view of an embodiment of the presently disclosed check valve.
Figure 2:
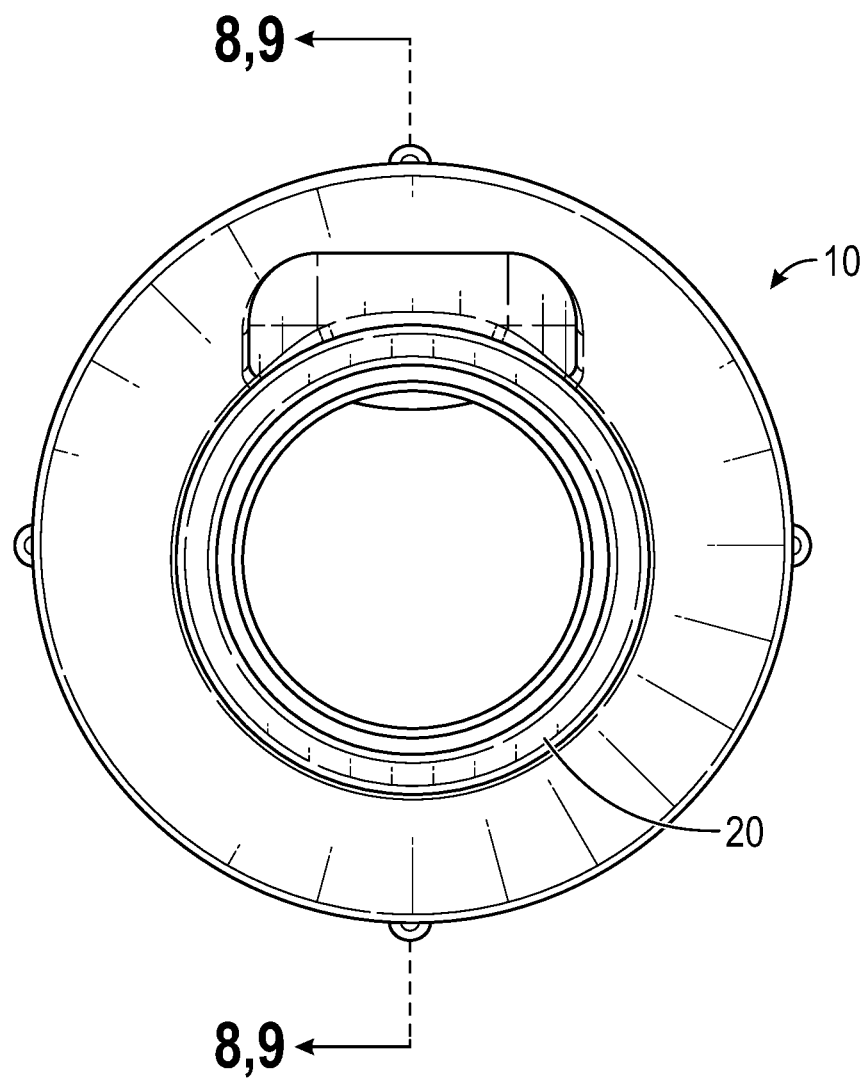
FIG. 2 depicts the outlet end of an embodiment of the presently disclosed check valve.
Figure 3:
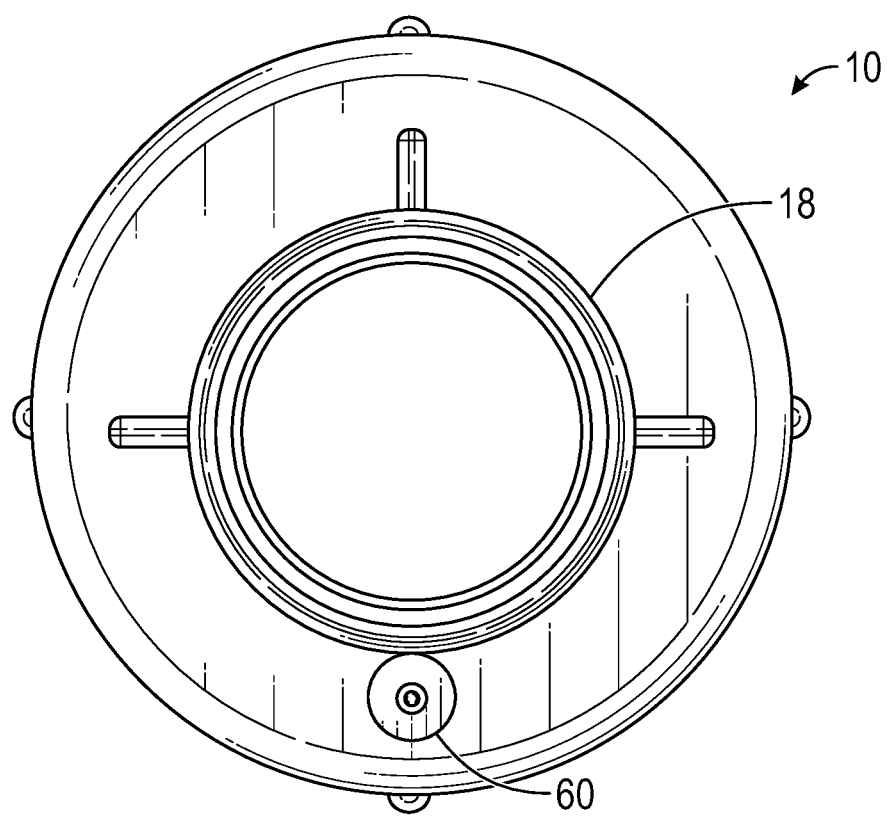
FIG. 3 depicts the inlet end of an embodiment of the presently disclosed check valve.
Figure 4:
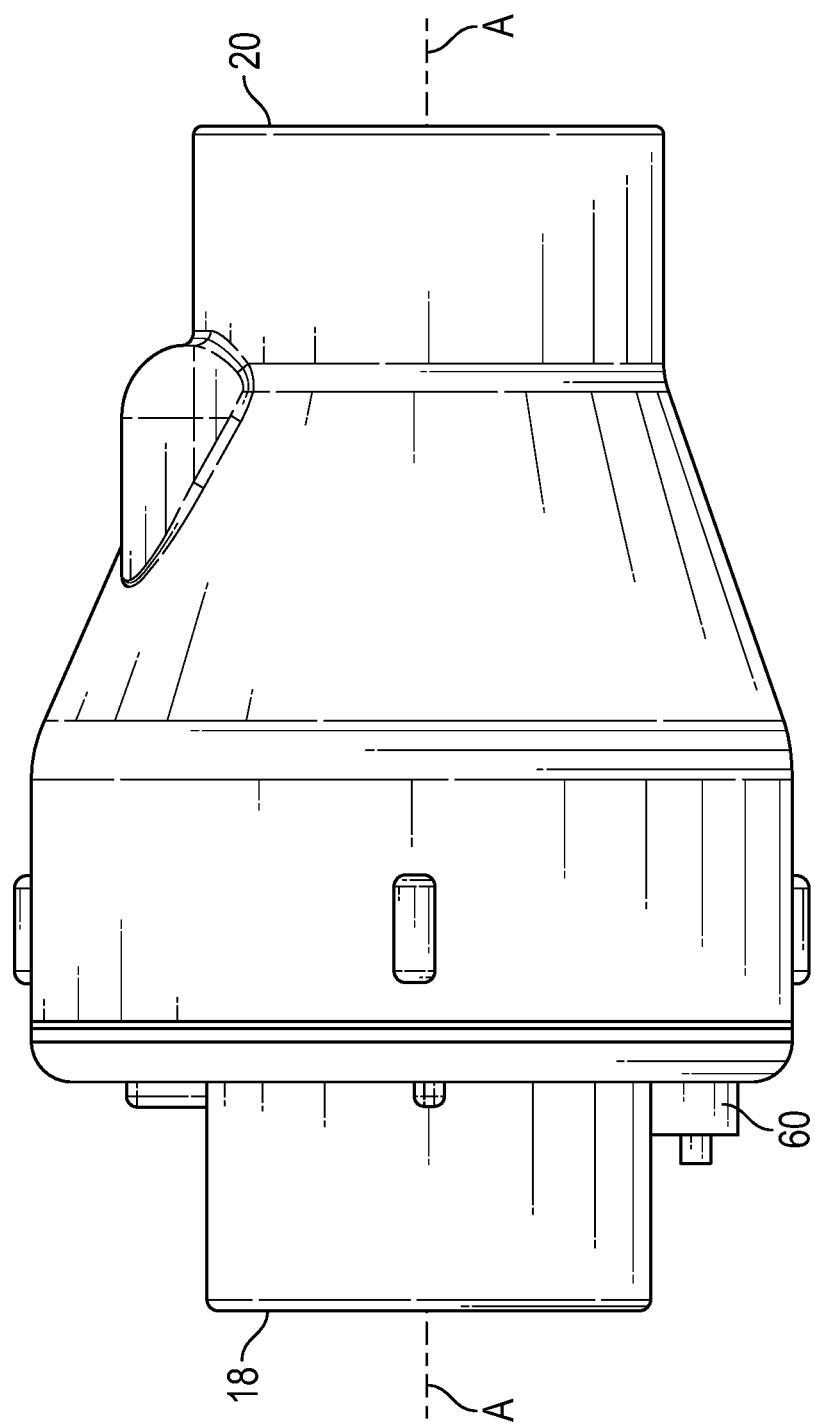
FIG. 4 depicts a first side view of an embodiment of the presently disclosed check valve.
Figure 5:
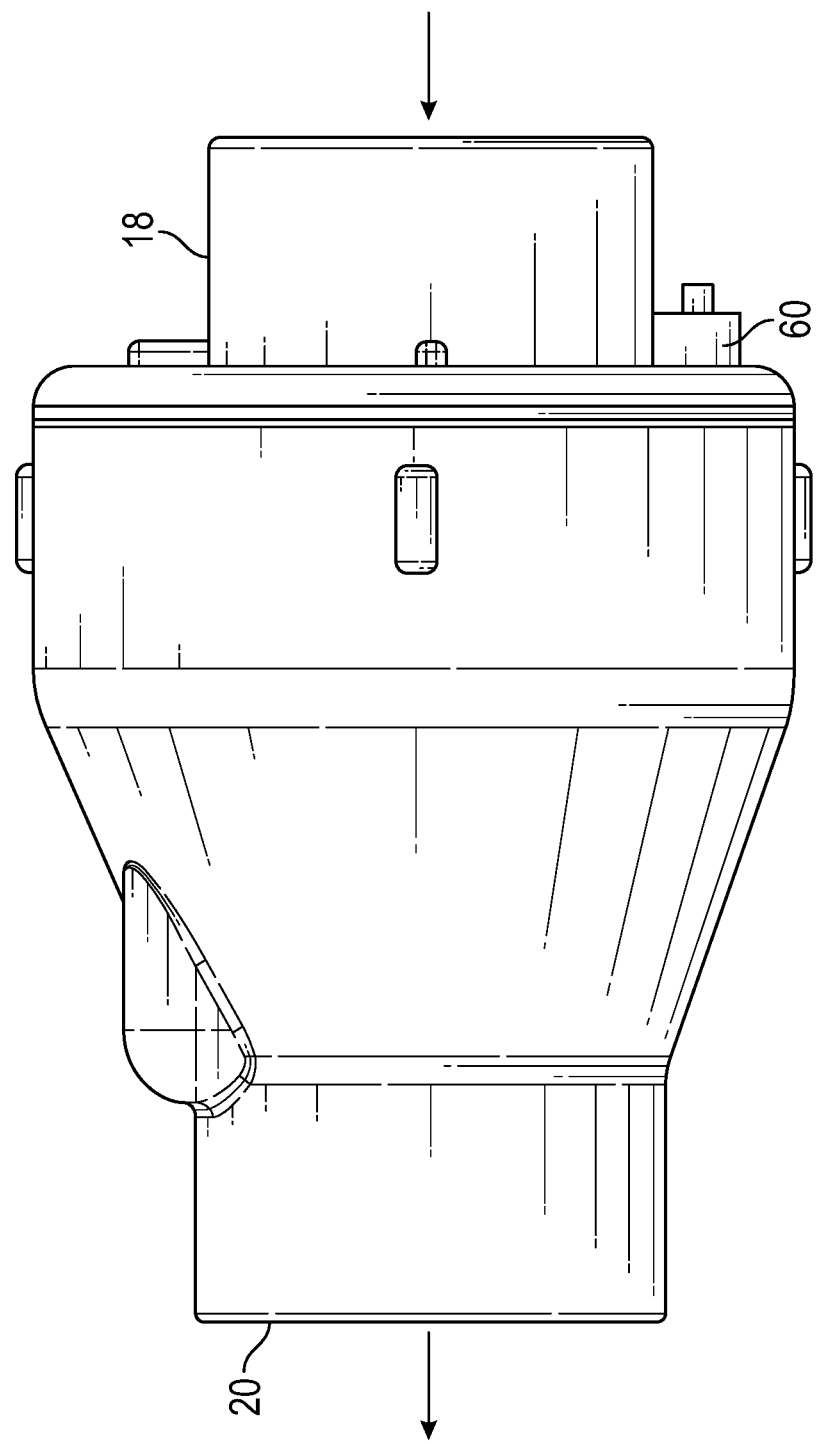
FIG. 5 depicts a second side view of an embodiment of the presently disclosed check valve.
Figure 6:
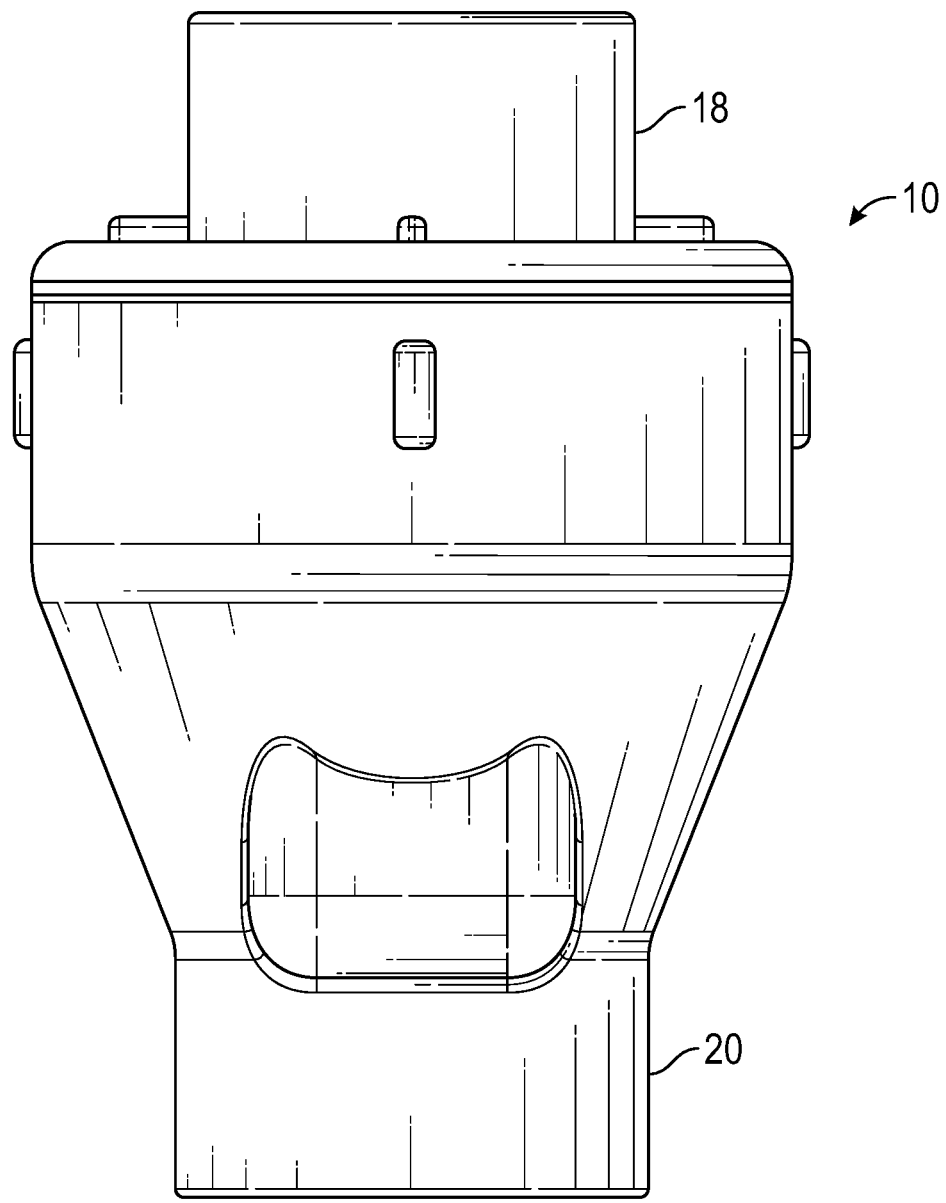
FIG. 6 depicts a "top" view of an embodiment of the presently disclosed check valve, the designation "top" selected arbitrarily without having significance in the operation of the valve.
Figure 7:
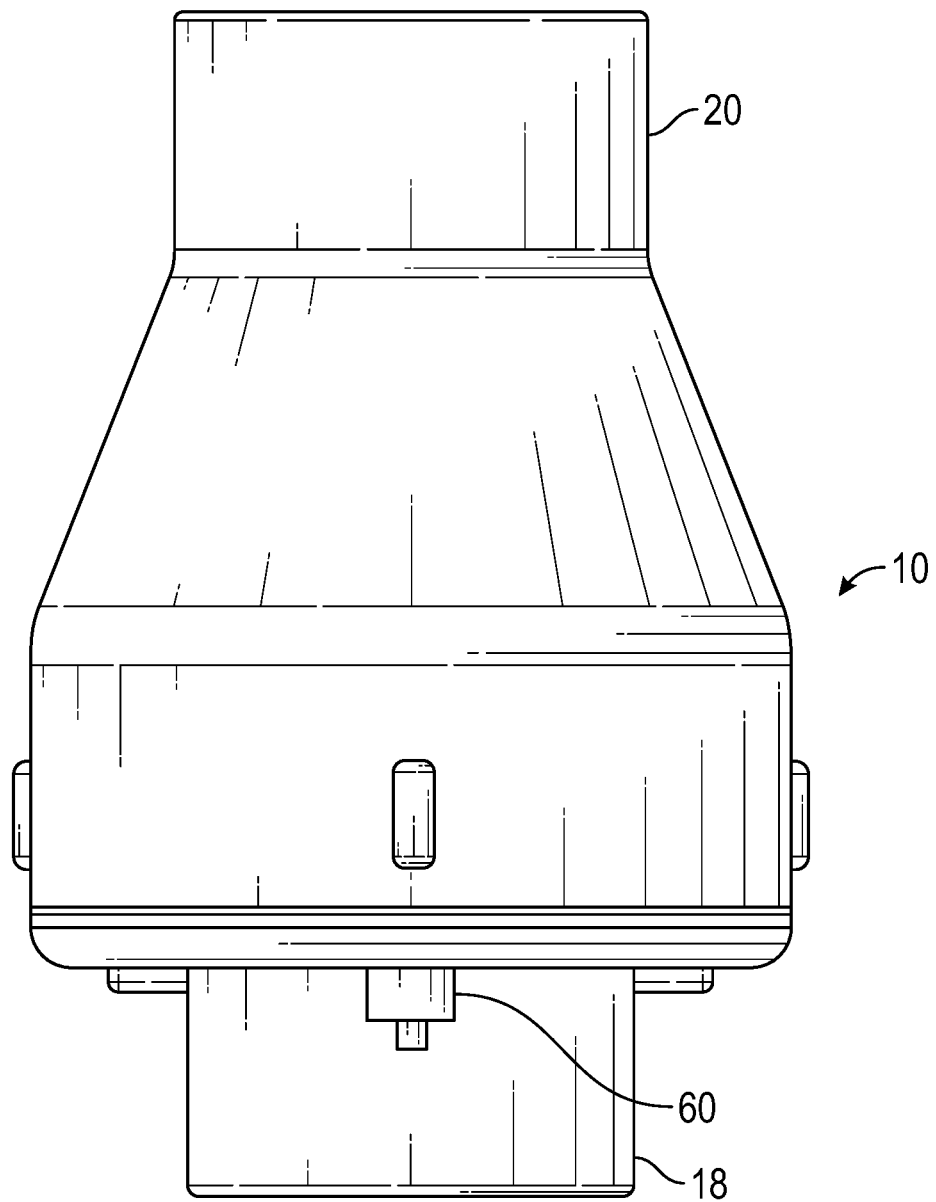
FIG. 7 depicts a "bottom" view of an embodiment of the presently disclosed check valve, the designation "bottom" selected arbitrarily without having significance in the operation of the valve.

Referring now to the figures, FIGS. 1 through 10 depict an embodiment of the presently disclosed check valve 10 and its components. Check valve 10 comprises a body 12 having an inside surface 14 and an outside surface 16. Check valve 10 has a central axis A from inlet 18 at the upstream end to outlet 20 at the downstream end with forward flow through the valve as indicated by the arrows, and with undesired backflow to be stopped by the valve in the opposite direction from the arrows.

Figure 8:
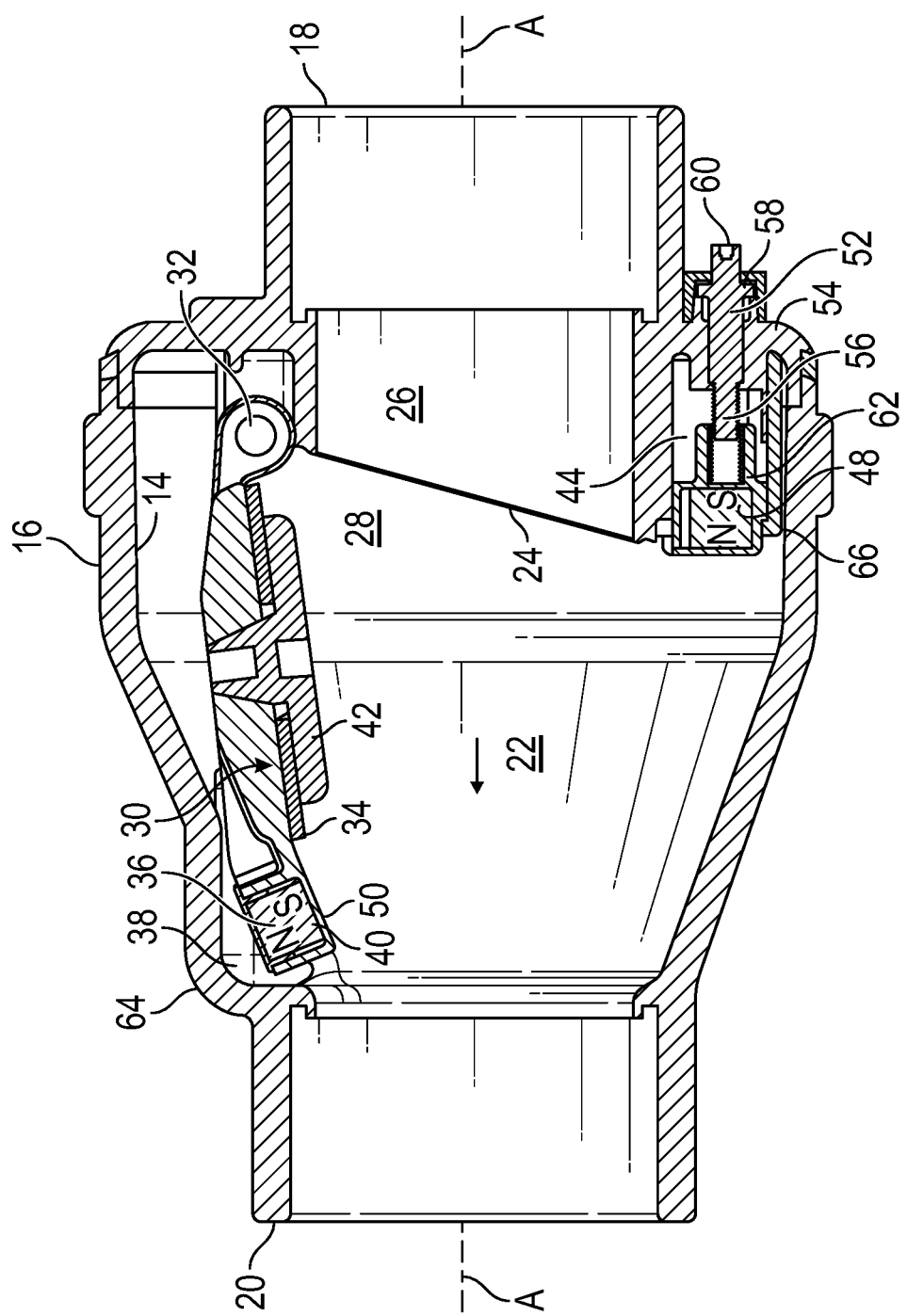
FIG. 8 depicts a sectional view taken along line 8-8 of FIG. 2 with the valve in an opened position.

As best shown in the sectional view of FIG. 8, a flow passage 22 exists within the interior of body 12 between inlet 18 and outlet 20. A valve seat 24 is set at the neck of a reduced diameter portion 26 which extends into valve chamber 28. Valve seat 24 may be disposed at an angle to central axis A as depicted in FIG. 8. A valve closure (or gate) 30 is pivotally attached to the interior of body 12 in the flow passage 22, such as by hinge pin 32. Valve closure 30 swings from the open position indicated in FIG. 8 to a closed position with valve closure disposed against valve seat 24, with the valve closure carrying a flexible valve seal 34 which is complementary to valve seat 24 and which, in the closed position, engages against valve seat 24 in sealing contact thereby preventing reverse flow of a fluid through the valve. Seal 34 may be held in place by seal retainer 42.

At the end of valve closure 30 opposite hinge pin 32, a compartment 36 may be disposed. It is to be appreciated that when the check valve 10 is in the open position with a full flow of liquid through flow passage 22, valve closure 30 may swing up out of the flow path with compartment 36 tucked up into inner recess 38 which is formed within the interior of body 12, allowing valve closure to be positioned out of the flow passage 22. This feature allows a full flow of fluid through flow passage 22 without restriction in the flow caused by valve closure 30. When the differential pressure drops, spring 68 returns the valve closure 30 to a position adjacent valve seat 24. However, spring 68 has substantially less tension than the springs utilized in the known spring-operated valves, so the increasing tension of spring 68 as the valve closure 30 swings into the fully open position does not give rise to the same problems typical for the known spring-operated valves.

Valve closure 30 comprises a ferromagnetic member 40 which may be disposed within compartment 36 of valve closure 30 or otherwise attached to valve closure 30. Ferromagnetic member 40 may be a magnet. If ferromagnetic member 40 is a magnet, it will have magnetic poles N and S which are positioned such that the poles are opposite facing with those of magnet 48 discussed below. If ferromagnetic member 40 is a magnet, compartment 36 is preferably configured as a watertight chamber.

Check valve 10 may further comprise a compartment 44 which has an end 46 adjacent to valve seat 24 and which opens up into flow passage 22. A magnet 48 is disposed in compartment 44, where magnet 48 is translatable along an axis parallel to central axis A, such that magnet 48 may be positioned in different positions within compartment 44. When check valve 10 is in a closed position with valve closure 30 sealing against valve seat 24, compartment 36 is positioned such that it is positioned immediately adjacent compartment 44 such that a magnetic field attracts ferromagnetic member 40 to magnet 48 creating a retention force which must be overcome for valve closure 30 to be released from valve seat 24. Because the magnetic force decreases as the distance between ferromagnetic member 40 and magnet 48 increases, the valve closure 30 need only overcome the slight tension imposed by spring 68 to open completely until the valve closure is positioned with compartment 36 tucked up into inner recess 38 as indicated in FIG. 8. Inner recess 38 is configured by outward extension in the wall of the body 12, which may be shown as a enlarge portion 64 in the outer surface. Thus, embodiments of the check valve 10 function differently than check valves which utilize springs to provide a retention force, where the springs have tensions which increase as the valve closure 30 opens away from the valve seat 24

Magnet 48 may be attached to a shaft 52 which extends into compartment 44. Shaft 52 may extend through an outer wall 54 of the check valve 10, having a first end 56 extending into the compartment 44 and a second end 58 extending outside of the outer wall 54. A knob 60 may be placed on second end 58. While shaft 52 may be used to push and pull magnet 48 through the length of compartment 44, in another embodiment shaft 52 is rotatable and rotation of the shaft in one direction translates magnet 48 toward end 46 and rotation in the opposite direction translates magnet 48 away from end 46. Magnet 48 may be enclosed in a magnet carriage 62 and the first end 56 of shaft 52 may attach to the magnet carriage. Compartment 44 may have an internal stop member 66 which limits the movement of the magnet carriage towards end 46.

Figure 9:
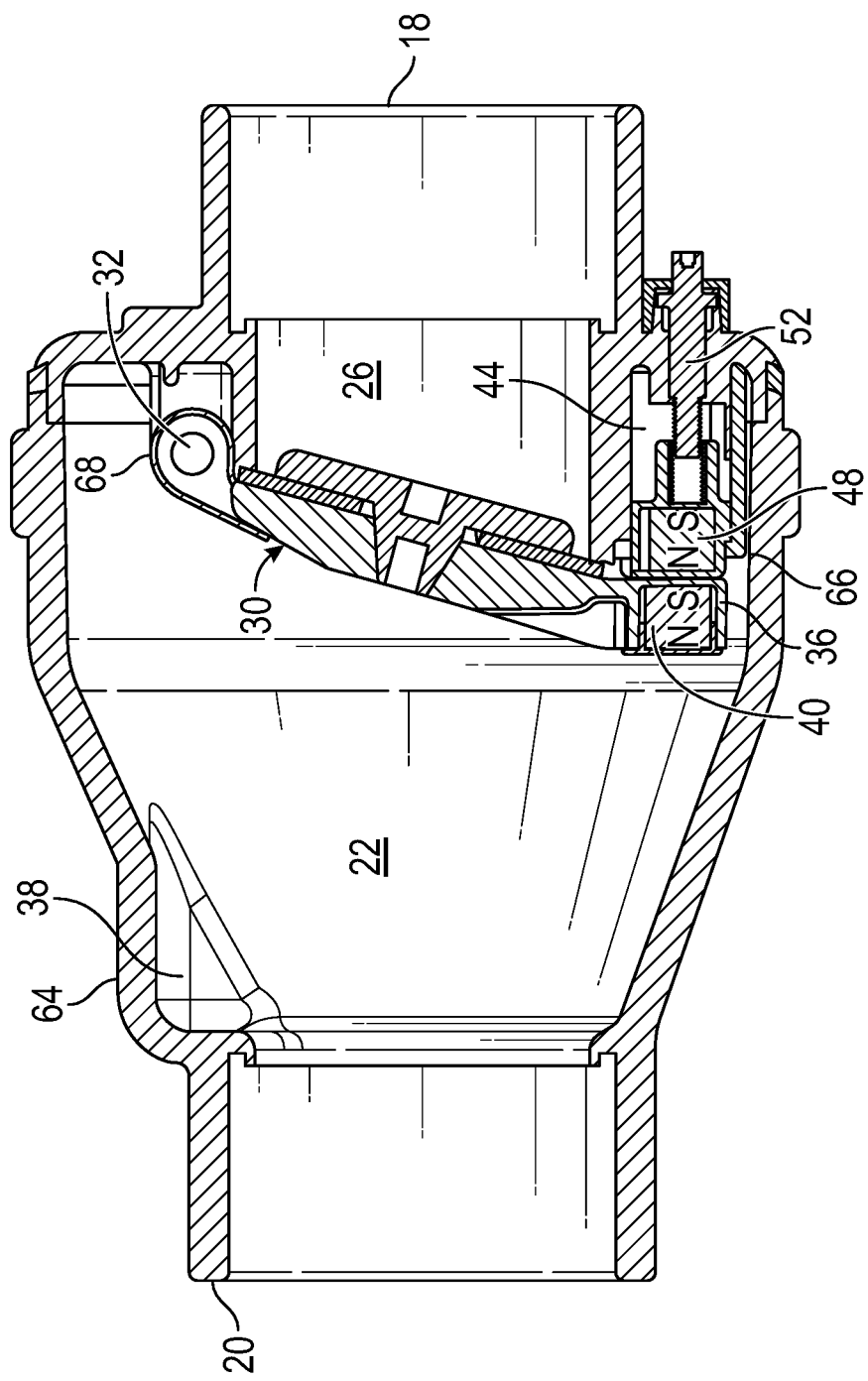
FIG. 9 depicts a sectional view taken along line 9-9 of FIG. 2 with the valve in a closed position, with detailed view 9A depicting an embodiment with the retention force being the strongest and detailed view 9B depicting an embodiment with the retention force being the weakest.
Figure 9A:
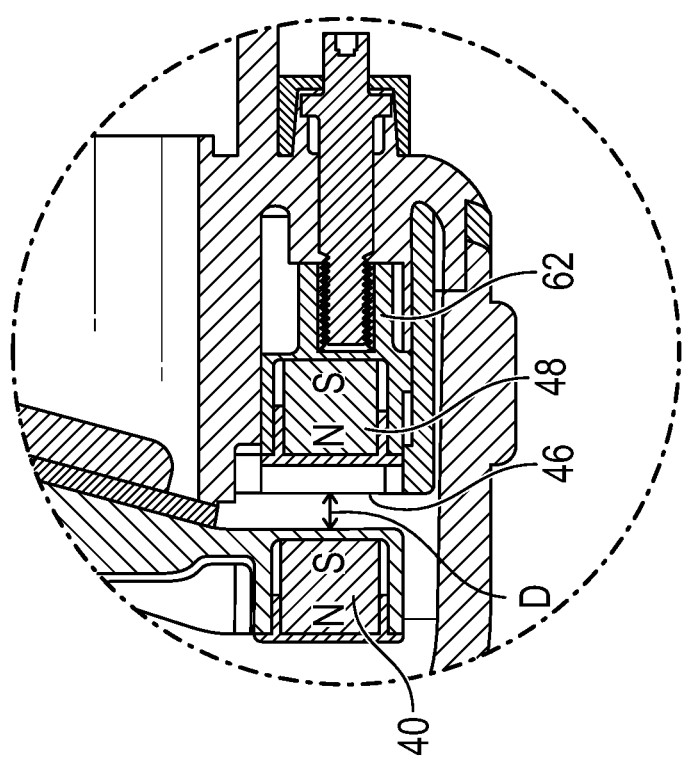
Figure 9B:
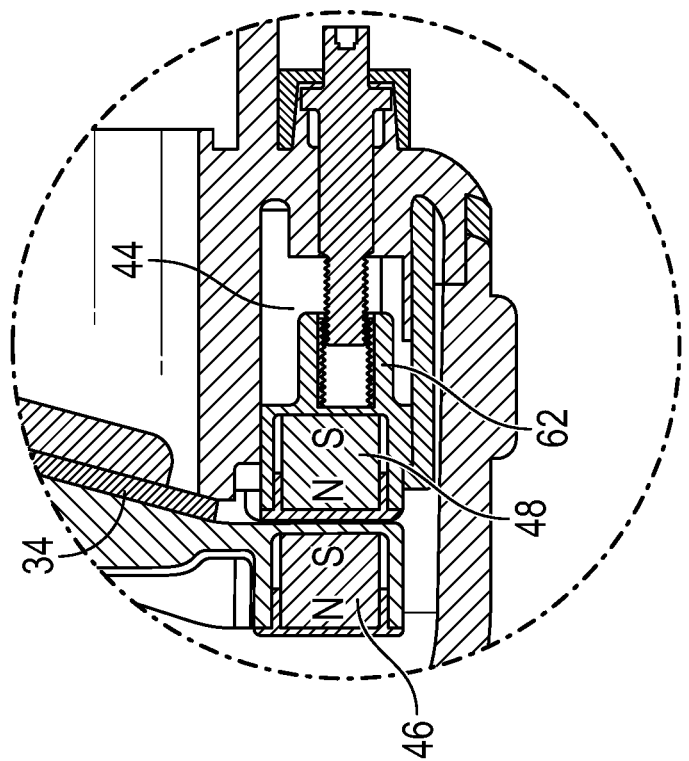
Figure 10:
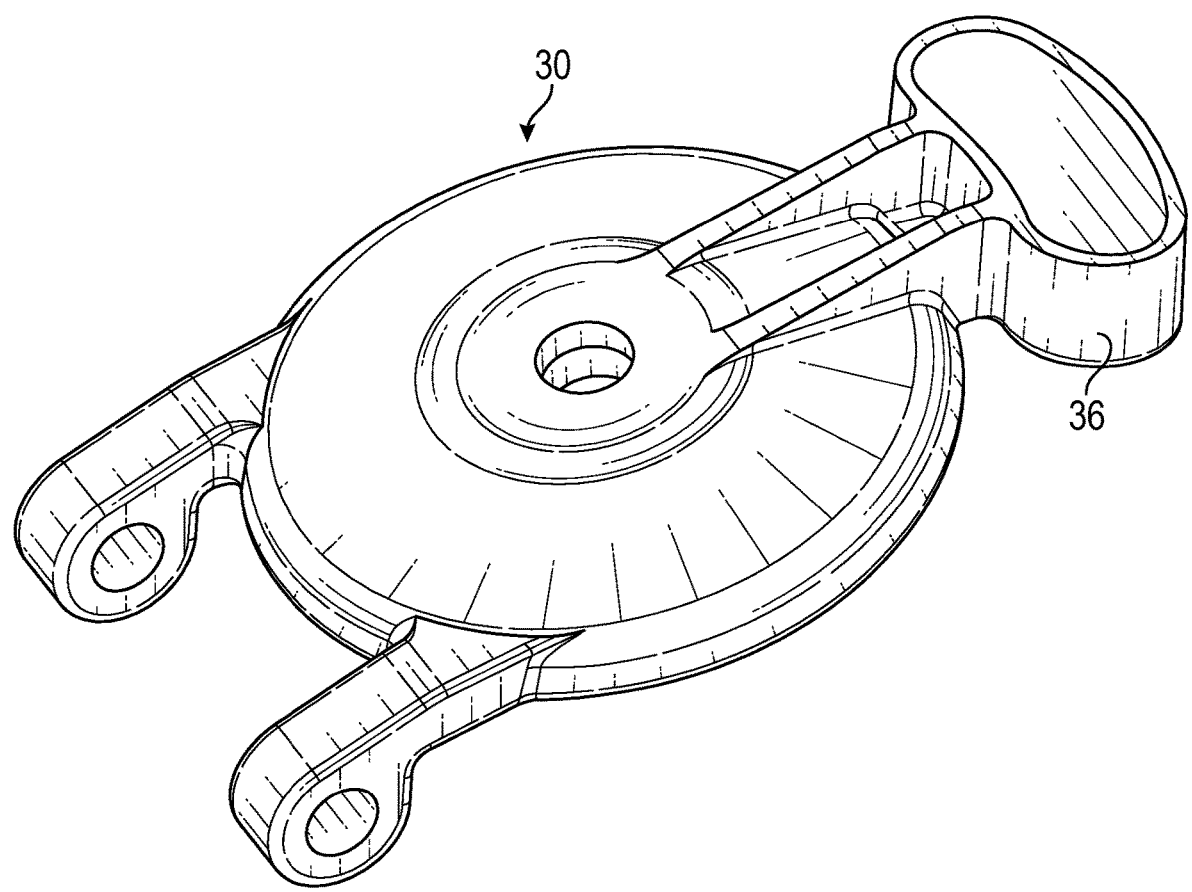
FIG. 10 depicts a portion of an embodiment of a gate member used in embodiments of the invention.

With embodiments of the present check valve 10, the retention force for the valve closure 30 or gate may be adjusted by manual manipulation of knob 60 which adjusts the magnetic force between the magnet 48 and the ferromagnetic member 40 by changing the linear distance D between the two structures, as depicted in FIGS. 9A and 9B. Thus, should operational changes occur, the differential pressure required to open the valve closure 30 can either be increased or decreased.

While the above is a description of various embodiments of the present invention, further modifications may be employed without departing from the spirit and scope of the present invention. Moreover, it is to be noted that the terms "top", "bottom", "front", "back", "left side", "right side", etc., are used in this application with respect to the relative orientation of embodiments of the invention as depicted in the drawings, but are not intended to limit how embodiments of the valve may be utilized or function. Embodiments of the present invention function in any orientation. Thus, the scope of the invention should not be limited according to these factors, but according to the following appended claims.

What is claimed is:

1. A valve having a body, an inlet port, an outlet port, and a flow passage there between, so constructed and arranged as to close so as to prevent a reverse flow of a fluid from the outlet port to the inlet port, and to open so as to permit a forward flow of the fluid from the inlet port to the outlet port thereby preventing the forward flow at a differential pressures lower than an adjustable value, said check valve comprising:
    a valve seat in said flow passage through which the fluid will flow;
    a first compartment adjacent said flow passage, said first compartment having an end adjacent to the flow passage;
    a shaft which extends into the first compartment;
    a valve closure carrying a valve seal complementary to said valve seat, said valve closure pivotally attached to said body inside said flow passage, the valve closure configured to pivot against and seal against the valve seat thereby preventing the reverse flow of the fluid thereby defining a closed position, and said valve closure configured to pivot away from said valve seat thereby permit the forward flow of the fluid thereby defining an open position, said valve closure further comprising a second compartment, wherein in the closed position the second compartment is pivoted to a position adjacent to the first compartment;
    a magnetic set which develops, when engaged, a retention force that must be overcome for the valve closure to move to the open position, the magnetic set comprising a first magnet and a ferromagnetic member, wherein the first magnet is disposed within the first compartment and the ferromagnetic member is disposed within the second compartment;
    wherein the first magnet is attached to the shaft and a first movement of the shaft translates the first magnet towards said end adjacent to the flow passage [1] and a second movement of the shaft translates the first magnet away from said end; and
    wherein the adjustable value is adjusted by translation of the first magnet within the first compartment.

2. The valve of claim 1 wherein the ferromagnetic member comprises a second magnet.

3. The valve of claim 1 wherein the shaft extends through an outer wall of the valve and has an end extending into the first compartment.

4. The valve of claim 1 wherein the shaft is rotatable and rotation of the shaft in a first rotational direction translates the first magnet toward the end adjacent said flow passage and rotation of the shaft in a second rotational direction translates the first magnet away from the end.

5. The valve of claim 1 wherein the valve closure comprises a gate body having a first end pivotally attached to an inside portion of said body and an opposite second end wherein the opposite second end comprises the second compartment.

6. The valve of claim 1 wherein the first magnet is enclosed within a magnet carriage.

7. The valve of claim 6 wherein the shaft attaches to an end of the magnet carriage.

8. The valve of claim 5 wherein the body comprises an inner recess into which the opposite second end is disposed during a full forward flow of the fluid.

9. The valve of claim 8 wherein the flow passage is fully open during a full forward flow of the fluid.

10. A valve having a body, an inlet port, an outlet port, and a flow passage there between, so constructed and arranged as to close so as to prevent a reverse flow of a fluid from the outlet port to the inlet port, and to open so as to permit a forward flow of the fluid from the inlet port to the outlet port, but only under a positive forward differential pressure at or above an adjustable value, thereby preventing the forward flow at pressures lower than said adjustable value, said check valve comprising:
    a valve seat in said passage through which the fluid will flow;
    a valve closure carrying a valve seal complementary to said valve seat, said valve closure pivotally attached to said body inside said flow passage, the valve closure configured to pivot against and seal against the valve seat thereby preventing the reverse flow of the fluid when the valve closure is in a closed position, and said valve closure configured to pivot away from said valve seat thereby permitting the forward flow of the fluid when the valve closure is in an open position;
    a magnetic set which develops, when the valve closure is in the closed position, a retention force that must be overcome for the valve closure to move to the open position, the magnet set comprising a first magnet enclosed within a first compartment adjacent said passage, the first magnet having a first magnetic pole and a second magnet having a second magnetic pole, wherein the separation of the first magnetic pole and the second magnetic pole is achieved by an axial translation of the first magnet within the first compartment, wherein the first magnetic pole and the second magnetic pole are disposed in attractive relationship when the valve closure is in the closed position, wherein the adjustable value is determined by a separation of the first magnetic pole and the second magnetic pole wherein the separation is manually adjustable.

11. The valve of claim 10 wherein the separation is manually adjustable from an exterior of the body.

12. The valve of claim 10 wherein the valve closure comprises the second magnet.

13. The valve of claim 12 wherein the first magnet is enclosed within a magnet carriage.

14. The valve of claim 10 wherein the first magnet is axially translated within the first compartment by a shaft having a first end attached to the first magnet.

15. The valve of claim 14 wherein the first magnet is axially translated within the first compartment by rotation of the shaft.

16. The valve of claim 14 wherein the shaft comprises a second end extending through an outer wall of the valve.

17. The valve of claim 10 wherein the body comprises an inner recess into which an end of the valve closure is disposed during a full forward flow of the fluid.

18. The valve of claim 17 wherein the flow passage is fully open during a full forward flow of the fluid.

19. A valve having a body, an inlet port, an outlet port, and a flow passage there between, so constructed and arranged as to close so as to prevent a reverse flow of a fluid from the outlet port to the inlet port, and to open so as to permit a forward flow of the fluid from the inlet port to the outlet port, but only under a positive forward differential pressure at or above an adjustable value, thereby preventing the forward flow at pressures lower than said adjustable value, said check valve comprising:

a valve seat in said passage through which the fluid will flow;

a valve closure carrying a valve seal complementary to said valve seat, said valve closure pivotally attached to said body inside said flow passage, the valve closure configured to pivot against and seal against the valve seat thereby preventing the reverse flow of the fluid when the valve closure is in a closed position, and said valve closure configured to pivot away from said valve seat thereby permitting the forward flow of the fluid when the valve closure is in an open position;

a magnetic set which develops, when the valve closure is in the closed position, a retention force that must be overcome for the valve closure to move to the open position, the magnet set comprising a first magnet enclosed within a first compartment adjacent said passage and the valve closure comprising a second magnet, wherein the first magnet is enclosed within a magnet carriage, wherein the first magnet has a first magnetic pole and the second magnet has a second magnetic pole, wherein the separation of the first magnetic pole and the second magnetic pole is achieved by an axial translation of the first magnet within the first compartment, wherein the first magnetic pole and the second magnetic pole are disposed in attractive relationship when the valve closure is in the closed position, wherein the adjustable value is determined by a separation of the first magnetic pole and the second magnetic pole wherein the separation is manually adjustable.

* * * * *